Patented Sept. 12, 1939

2,172,434

UNITED STATES PATENT OFFICE 2,172,434

CHLORINE DIOXIDE MANUFACTURE

George Lewis Cunningham, Niagara Falls, N. Y., assignor to The Mathieson Alkali Works, Inc., New York, N. Y., a corporation of Virginia No Drawing. Application April 14, 1937,
Serial No. 136,800

6 Claims. (Cl. 23—152)

This invention relates to an improved process for the production of chlorine dioxide. In particular, it relates to a process for the production of chlorine dioxide from solutions of certain metal chlorates.

It has hitherto been proposed to produce chlorine dioxide, ($ClO_2$), by reaction between chlorates and concentrated hydrochloric acid, (HCl), and by reaction between chlorates and concentrated sulphuric acid, ($H_2SO_4$). Both of these processes have failed to attain commercial importance because of the poor recoveries involved and the accompanying explosion hazard. Another process has been proposed according to which certain organic reducing agents are caused to react with alkali metal chlorates in acid solution. In this method, while the danger of explosion has been diminished, the efficiencies are poor and the cost of the organic reducing agent makes its use on a commercial scale impractical.

According to the process of the present invention, a safe, economical, and highly efficient method of producing chlorine dioxide is provided. The process may be operated in a cyclic manner thus adding to its advantage in commercial operation.

I have found that when aqueous solutions of the chlorates of certain multivalent metals are heated, $ClO_2$ is evolved. The $ClO_2$ is, with advantage, swept from the solution by a stream of air. This expedient serves to dilute the $ClO_2$ thus preventing the formation of an explosive mixture. It also serves to remove the $ClO_2$ rapidly from the solution, in this way reducing the opportunity of the $ClO_2$ to decompose in the presence of the warm aqueous solution.

The chlorates which operate successfully in my process are those of variable valence metals in a state of lower valence which are readily oxidized to a higher valence level. When the aqueous solution of such a chlorate is heated to about 60°–90° C., an internal oxidation-reduction occurs in which the chlorate ion is requested to $ClO_2$ and the metallic ion is oxidized to a higher valence level. I have found that solutions of the chlorates of the following metallic ions operate successfully to give such a reaction: $Mn^{++}$, $Cr^{+++}$, $Fe^{++}$, $Sn^{++}$, $Ce^{+++}$. The reaction involved in the process of my invention may be typified by the following equation:

$$Mn(ClO_3)_2 = MnO_2 + 2ClO_2.$$
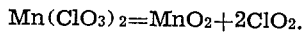

According to a further embodiment of my invention, it is unnecessary to employ a chlorate of one of the above enumerated metals as a starting material. The same reaction can be effected when reciprocal salt pairs are present in the solution, provided that one of the salts contains the chlorate ion and the other the variable valence metallic ion in a reduced form. According to this embodiment $ClO_2$ is produced, for example, by heating an aqueous solution containing $MnCl_2$ and $NaClO_3$. The chemical reaction taking place in this embodiment of the process of the invention may be typified by the following equations:

$$MnCl_2 + 2NaClO_3 = 2NaCl + MnO_2 + 2ClO_2.$$

For economic reasons, this method is the more advantageous in large scale commercial operations.

Added economies are obtained by operating in a cyclic manner with respect to the metallic reducing ion. Thus, in the example cited in the preceding paragraph, the precipitated $MnO_2$ may be separated from the solution and reduced to $MnCl_2$, the starting material, by reaction with HCl according to the conventional procedure, as typified by the following equation:

$$MnO_2 + 4HCl = MnCl_2 + H_2O + Cl_2.$$
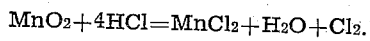

It will be observed that chlorine is formed in this reaction. It may be recovered as a by-product. The $MnCl_2$ formed is returned to the reaction with additional quantities of the starting chlorate.

In operating according to the process of my invention, the aqueous chlorate solution of either of the above-described embodiments is heated to a temperature ranging from 50° C. up to the boiling point of the solution. In order to obtain the highest efficiencies and also the greatest safety of operation, I prefer to heat the solution to about 60°–80° C. It is well known that the explosive properties of $ClO_2$ depend largely on the temperature, and that handling $ClO_2$ at temperatures above 60° C. under ordinary conditions is a dangerous practice. In addition to the temperature factor, however, the danger of explosion also depends on the concentration of the $ClO_2$ in the gas mixture. According to my preferred operation, the explosion hazard is reduced to a minimum by a dilution of the $ClO_2$ with an inert gas such as, for example, air or nitrogen. This is accomplished by passing a stream of an inert gas through the solution while it is being heated. This sweeps the $ClO_2$ from the solution and causes the concentration of the effluent gas to be within safe limits. In this way my process may be operated so that the resulting gas mixture can be heated to 80°–90° C. and still be within the limits of safe operation. The use of such an inert gas to sweep the ClO₂ rapidly from the reaction chamber has the added advantage that it removes the ClO₂ as soon as it is formed. The produced gas is thus allowed to remain in contact with the warm aqueous solution for a very short period of time. This reduces the possible decomposition of the chlorine dioxide in the warm aqueous solution to a minimum. The apparatus which is most advantageously used in my process is one which introduces the inert gas into the solution in such a way that it will have a maximum contact with the solution as it passes through it.

The solutions or slurries to be employed in my process operate most successfully when in a concentrated state. In general, such characteristics as reaction rate, yield, and purity of product are highest when there is not less than about 25% of salt present.

If the chlorate solution is heated too rapidly or for too long a period of time, varying amounts of chlorine will be formed which will contaminate the ClO₂. By sweeping out the ClO₂, as described, a product free from chlorine is obtained during the earlier stages of the heating. During the later stages of the heating of the solution, chlorine begins to come off, giving a product which is a mixture of the two gases.

The two following examples will serve to illustrate operation according to the process of my invention:

*Example I*

One gram mole of $Ca(ClO_3)_2$ is added to one gram mole of $MnSO_4$ dissolved in 500 cc. $H_2O$. The precipitated $CaSO_4$ is filtered off. The filtrate is placed in a suitable vessel and heated to 60°–80° C. Air is passed through the solution during the heating at a rate of about two liters per minute. Initially, a mixture of air and pure chlorine dioxide is evolved. In the later stages of the reaction chlorine is evolved in addition to ClO₂. The $MnO_2$ formed during the heating may be filtered off and reduced by means of HCl. The $MnCl_2$ formed may then be reacted with additional $Ca(ClO_3)_2$ in a repetition of the reaction.

*Example II*

One gram mole of $NaClO_3$ is added to one-half gram mole of $MnCl_2$ dissolved in 200 cc. $H_2O$. The solution is heated to 60°–80° C. Nitrogen is passed through the solution at the rate of two liters per minute. The effluent gas during the first stages of reaction is composed of nitrogen and chlorine dioxide. In the later stages of the reaction nitrogen and a mixture of chlorine dioxide and chlorine are evolved. The precipitated $MnO_2$ may be reduced and returned to a repetition of the reaction.

I claim:

1. The method of producing chlorine dioxide which comprises heating an aqueous solution containing manganous chlorate to a temperature between 50° C. and 90° C. while continuously removing the formed ClO₂ by passing a stream of inert gas through the reaction solution.

2. The method of producing chlorine dioxide which comprises heating an aqueous solution containing a manganous salt and a chlorate of a metal of the class consisting of alkali metals, alkaline earth metals and magnesium to a temperature between 50° C. and the boiling point of the solution while continuously removing the formed ClO₂ by passing a stream of inert gas through the reaction solution.

3. The method of producing chlorine dioxide which comprises heating an aqueous solution containing a manganous salt and a chlorate of a metal of the class consisting of alkali metals, alkaline earth metals and magnesium to a temperature between 50° C. and the boiling point of the solution while continuously removing the formed ClO₂ by passing a stream of inert gas through the reaction solution, separating from the solution the manganese dioxide formed in the reaction, reducing said manganese dioxide to a manganous salt and returning said manganous salt to further reaction with chlorate solution.

4. The method of producing chlorine dioxide which comprises heating to a temperature between 50° C. and its boiling point an aqueous solution containing chlorate ions and ions of a variable valence metal in one of its lower valence levels selected from the class consisting of manganese, chromium, iron, tin and cerium.

5. The method of producing chlorine dioxide which comprises heating to a temperature between 50° C. and 90° C. an aqueous solution containing chlorate ions and ions of a variable valence metal in one of its lower valence levels selected from the class consisting of manganese, chromium, iron, tin and cerium, while removing the formed ClO₂ by passing a stream of inert gas through the reaction solution.

6. A cyclic process for the production of chlorine dioxide which comprises heating to a temperature between 50° C. and 90° C. an aqueous solution containing chlorate ions and ions of a variable valence metal in one of its lower valence levels selected from the class consisting of manganese, chromium, iron, tin and cerium, while removing the formed ClO₂ by passing a stream of inert gas through the reaction solution, separating from the solution the reaction product containing the variable valence metal which has been oxidized to a higher valence level, reducing said oxidized metallic compound and returning the reduced product to further reaction with chlorate solution.

GEORGE LEWIS CUNNINGHAM.